United States Patent
Wu et al.

(10) Patent No.: US 12,047,914 B2
(45) Date of Patent: Jul. 23, 2024

(54) INTER-UE COORDINATION FOR ON-DEMAND SENSING

(71) Applicant: APPLE INC., Cupertino, CA (US)

(72) Inventors: Zhibin Wu, Cupertino, CA (US); Chunxuan Ye, San Diego, CA (US); Dawei Zhang, Cupertino, CA (US); Fangli Xu, Beijing (CN); Haijing Hu, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 450 days.

(21) Appl. No.: 17/593,244

(22) PCT Filed: Apr. 1, 2021

(86) PCT No.: PCT/CN2021/085076
§ 371 (c)(1),
(2) Date: Sep. 14, 2021

(87) PCT Pub. No.: WO2022/205363
PCT Pub. Date: Oct. 6, 2022

(65) Prior Publication Data
US 2023/0199718 A1  Jun. 22, 2023

(51) Int. Cl.
*H04W 4/00* (2018.01)
*H04W 28/26* (2009.01)
(Continued)

(52) U.S. Cl.
CPC .......... *H04W 72/02* (2013.01); *H04W 28/26* (2013.01); *H04W 72/563* (2023.01); *H04W 92/18* (2013.01)

(58) Field of Classification Search
CPC ... H04W 72/02; H04W 28/26; H04W 72/563; H04W 92/18; H04W 84/12; H04W 88/06; H04W 76/23; H04W 72/20; H04W 76/27
(Continued)

(56) References Cited

U.S. PATENT DOCUMENTS 11,012,145 B2 * 5/2021 Basu Mallick ....... H04W 8/005
11,172,508 B2 * 11/2021 Nguyen ................ H04W 28/26
(Continued)

FOREIGN PATENT DOCUMENTS

CN  110972276 A  4/2020
CN  111527718 A  8/2020

OTHER PUBLICATIONS

PCT/CN2021/085076, International Search Report and Written Opinion, Dec. 31, 2021, 9 pages.
(Continued)

*Primary Examiner* — Amancio Gonzalez
(74) *Attorney, Agent, or Firm* — Dorsey & Whitney LLP

(57) ABSTRACT

Disclosed are embodiments for a request and response signaling between first and second user equipment (UE) via a PC5 link for configuring inter-UE coordination. In some embodiments, request signaling entails a first UE identifying a transmit resource pool of the first UE to be sensed or evaluated by the second UE; instructing the second UE to report information indicating a quantity of resources; and instructing the second UE to evaluate the resources to be reported. In other embodiments, response signaling entails a first UE receiving from the second UE a request signal for inter-UE coordination; indicating a set of one or more resources, in which the set is indicated as corresponding to whitelist, blacklist, or collision list; and providing a validity time for resources indicated.

20 Claims, 10 Drawing Sheets

(51) Int. Cl.
*H04W 72/02* (2009.01)
*H04W 72/563* (2023.01)
*H04W 92/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 11,394,514 | B2* | 7/2022 | Baldemair | H04W 72/0446 |
| 11,438,878 | B1* | 9/2022 | Xue | H04W 74/006 |
| 11,497,000 | B2* | 11/2022 | Wu | H04W 72/20 |
| 11,638,258 | B2* | 4/2023 | Bayesteh | G01S 7/0232 |
| | | | | 370/336 |
| 11,664,866 | B2* | 5/2023 | Raghavan | H04B 7/063 |
| | | | | 375/267 |
| 11,690,074 | B2* | 6/2023 | Xue | H04W 72/20 |
| | | | | 370/329 |
| 11,737,096 | B2* | 8/2023 | Li | H04L 5/0033 |
| | | | | 370/329 |
| 11,805,520 | B2* | 10/2023 | Zhang | H04L 5/0053 |
| 11,849,439 | B2* | 12/2023 | Yang | H04W 76/34 |
| 2016/0205647 | A1* | 7/2016 | Seo | H04W 72/21 |
| | | | | 370/252 |
| 2019/0053127 | A1* | 2/2019 | Jung | H04W 48/16 |
| 2020/0145867 | A1 | 5/2020 | Tseng et al. | |
| 2020/0178217 | A1 | 6/2020 | Huang et al. | |
| 2021/0211239 | A1* | 7/2021 | Fan | H04L 49/3072 |
| 2021/0250948 | A1* | 8/2021 | Deng | H04W 76/34 |
| 2021/0352740 | A1* | 11/2021 | Liu | H04W 74/0841 |
| 2022/0015070 | A1* | 1/2022 | Chen | H04W 72/23 |
| 2022/0061055 | A1* | 2/2022 | Freda | H04W 72/1263 |
| 2022/0086803 | A1* | 3/2022 | Li | H04W 72/0446 |
| 2022/0150730 | A1* | 5/2022 | Freda | H04L 1/1812 |
| 2022/0216945 | A1* | 7/2022 | Xu | H04L 1/1854 |
| 2022/0286224 | A1* | 9/2022 | Hosseini | H04L 5/001 |
| 2022/0312517 | A1* | 9/2022 | Xu | H04W 72/04 |
| 2022/0361268 | A1* | 11/2022 | Pan | H04W 88/04 |
| 2022/0385409 | A1* | 12/2022 | Park | H04L 1/0026 |
| 2023/0007630 | A1* | 1/2023 | Yang | H04W 72/02 |
| 2023/0171738 | A1* | 6/2023 | Di Girolamo | H04W 72/20 |
| | | | | 370/329 |
| 2023/0171843 | A1* | 6/2023 | Luo | H04W 68/005 |
| | | | | 370/310 |
| 2023/0239955 | A1* | 7/2023 | Wu | H04W 8/22 |
| 2024/0032058 | A1* | 1/2024 | Lee | H04W 76/28 |

OTHER PUBLICATIONS

Samsung, "On Feasibility and Benefits for Mode2 Enhancements", R1-2006171, 3GPP TSG RAN WG1 #102-e, e-Meeting, Agenda Item 8.11.2.2, Aug. 17-28, 2020, 3 pages.

Apple, "Inter-UE Coordination for Mode 2 Resource Allocation", R1-2101358, 3GPP TSG RAN WG1 #104-e, e-Meeting, Agenda Item 8.11.1.2, Jan. 25-Feb. 5, 2021, 8 pages.

Huawei, Hisilicon, "Inter-UE coordination in sidelink resource allocation", R1-2100206, 3GPP TSG RAN WGI Meeting #104-e, E-meeting, Agenda Item 8.11.1.2, Jan. 25-Feb. 5, 2021, 12 pages.

Vivo, "Discussion on mode 2 enhancements", R1-2101911, 3GPP TSG RAN WG1 #104-e, e-Meeting, Agenda Item 8.11.1.2, Jan. 25-Feb. 5, 2021, 12 pages.

* cited by examiner

INTER-UE COORDINATION FOR ON-DEMAND SENSING

TECHNICAL FIELD

This application relates generally to wireless communication systems, including inter-UE coordination.

BACKGROUND OF THE DISCLOSURE

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
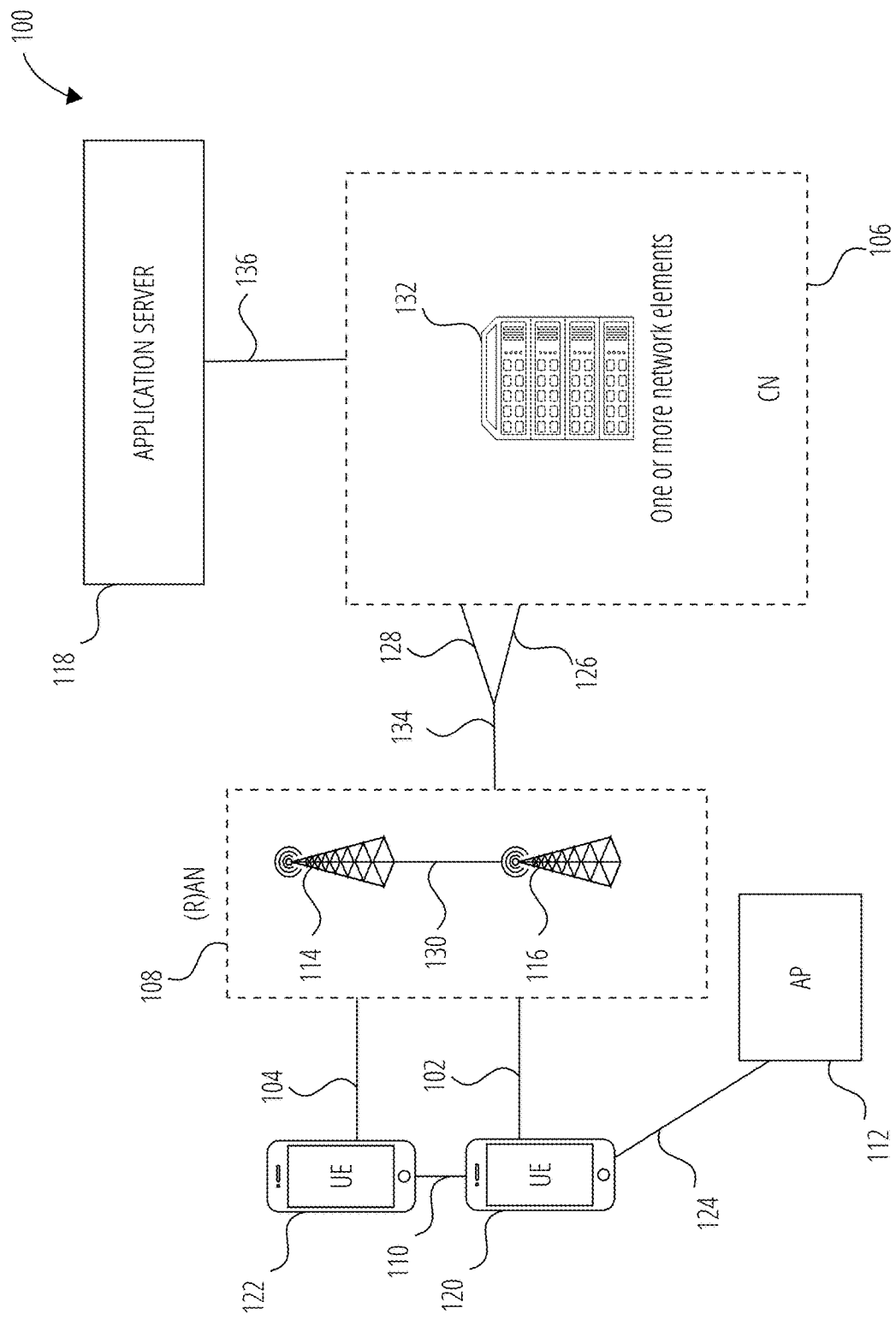
FIG. 1 is a block diagram of a wireless communications system.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 1002.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a 5G RAN, an E-UTRAN, or a legacy RAN, such as a UTRAN or GERAN. As used herein, the term "NG RAN" or the like may refer to a (R)AN 108 that operates in an NR or 5G system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 1002.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an 5GC via an NG interface (discussed infra). In vehicle-to-everything (V2X) scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 1002.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 106 is an 5GC), the interface 130 may be an Xn interface. The Xn interface is defined between two or more RAN nodes (e.g., two or more gNBs and the like) that connect to 5GC, between a RAN node 114 (e.g., a gNB) connecting to 5GC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network-in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and AMFs.

In embodiments, the CN 106 may be a 5G CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

Figure 2:
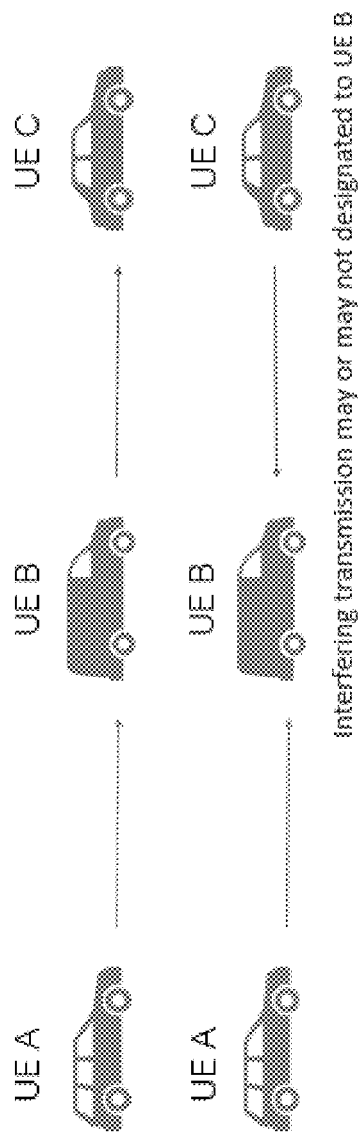
FIG. 2 is a block diagram of a vehicle-to-vehicle communications system.

FIG. 2 shows an example of a V2X communication system, and this figure is also provided to explain a hidden terminal problem in previous V2X attempts. Initially, it should be understood that the direct communication between vehicle and other devices (V2V, V2I) uses a so-called PC5 interface. PC5 refers to a reference point where the UE, i.e., a mobile handset, directly communicates with another UE over the direct channel (communication with the base station is not employed for a PC5 link.) In a system architectural level, proximity service (ProSe) is the feature that specifies the architecture of the direct communication between UEs. In 3GPP RAN specifications, "sidelink" is the terminology referring to the direct communication over PC5. PC5 interface was originally defined to address the needs of mission-critical communication for public safety community (Public Safety-LTE, or PS-LTE) in previous releases of the 3GPP standard.

In the example of FIG. 2, UE B is within transmission range of both UE A and UE C. UE B can then receive transmissions from and detect sub-channel resource reservation(s) of UE A and UE C. UE A and UE C, however, are out of range of each other and thereby experience the hidden terminal problem. Accordingly, UE A and UE C may inadvertently select the same resource(s) for their transmissions to UE B.

Release 16 (Rel-16) of the 3GPP standard (also referred to as 3GPP R16) defines two modes (modes 1 and 2) for the selection of sub-channels in NR V2X SL communications using the NR V2X PC5 interface. In mode 1, the gNB or eNB assigns and manages the SL radio resources for V2V communications under mode 1 using the NR (or LTE) Uu interface. UEs are therefore in network coverage to operate using mode 1. In mode 2, UEs can autonomously select their SL resources (one or several sub-channels) from a resource pool when in NR V2X. In this case, UEs can operate without network coverage.

Figure 3:
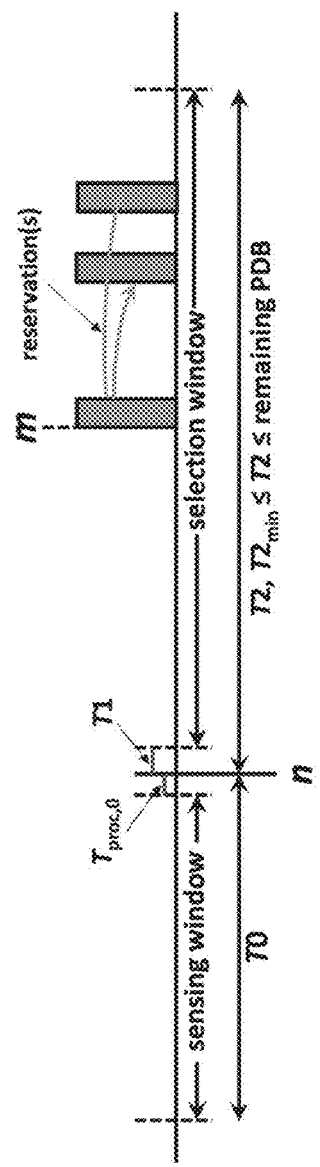
FIG. 3 is an annotated timing diagram showing an example of sensing for inter-UE coordination.

FIG. 3 shows an example timing diagram for sensing in NR V2X Rel-16 systems is based on LTE-V2X (and done in mode-2 transmit UE). Sensing entails collection, selection (evaluation), and reservation. Collection is done all the time (which has a cost in terms of power usage). Selection/reservation is done when resource needs to be allocated. LTE-V2X partial sensing, however, entails collection, a limited selection, and reservation. In addition to the collision (hidden node) problem issue noted above with reference to FIG. 2, another issue that is not addressed in previous sensing-based resource selection (mode 2) attempts is half-duplex, e.g., since a UE cannot sense the reservations from other UEs announced in the slots of the sensing window where the UE was transmitting.

In inter-UE coordination (IUC)—an SL enhancement adopted for Release 17 (Rel-17) of the 3GPP standard intended to address the hidden terminal problem—a UE can assist other UE(s) in their resource selection process. A 3GPP RAN1 #104 meeting concluded that the inter-UE coordination in mode 2 is feasible, and is beneficial (e.g., reliability, etc.) compared to Rel-16 mode 2 resource allocation (RA), and thus recommended specification of the feature. At the 3GPP RAN1 #104 meeting, items for future study included details of resource conflict, e.g., including type of resource conflict; details of sensing operation at UE A side; and which type(s) of resource set information is(are) beneficial/feasible to which cast type(s).

In some embodiments, there are three types of inter-UE coordination: type A, B, and C. Under type A, an assisting UE restricts the resources that can be used by an assisted UE (i.e., whitelist). In other words, a UE A sends to a UE B the set of resources preferred for UE B's transmission, e.g., based on its sensing result. Under type B (i.e., blacklist), a UE A sends to a UE B the set of resources that are not preferred for UE B's transmission, e.g., based on its sensing result and/or expected/potential resource conflict. Under type C (i.e., collision list), a UE A sends to a UE B the set of resources where the resource conflict is detected (history). Note: these different types may be used in combination with each other.

According to prior behavior (i.e., 3GPP R16 specified behavior), sensing is conducted by transmit UE all the time based on RRC configuration. An issue with this approach is that a UE B cannot assume a UE A is supporting IUC to always do "full sensing" and always have results available to respond. Another issue is transmit/receive role mismatching: sensing is not used for the receive UE at all. (SIB may not configure transmit pool). Finally, there is an issue with configuration mismatching: even if a UE A conducts its own full sensing for transmit purpose, it may not be sensing the same transmit pool as a UE B.

Figure 4:
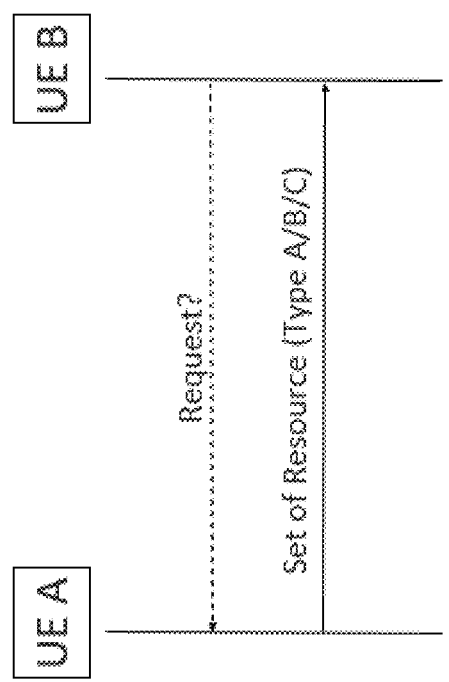
FIG. 4 is an annotated message diagram showing an example of request and response signaling for on-demand sensing in connection with inter-UE coordination.

To support type A and type B, some embodiments include "on-demand sensing." For example, FIG. 4 shows that with on-demand sensing, a UE A does not usually do sensing. It starts sensing after receiving a request from another UE B via PC5 link. This also means the response may not be immediately available because sensing takes time to complete (i.e., collection+selection/evaluation). To conduct on-demand sensing, it may be configured in the PC5 signaling. For type B or type C, sensing is optional. Also, a detection of "negative" choice can be from: collision detection in UE's own reception process, or resource reservation already done by UE A itself.

In some embodiments, on-demand sensing and inter-UE coordination may be extended to mode 1, e.g., if simultaneous mode 1/mode 2 is supported in Rel-17/Rel-18.

In some embodiments, triggering conditions may be related to how the signaling is designed. For example, FIG. 5 shows three different triggering mechanisms.

Figure 5:
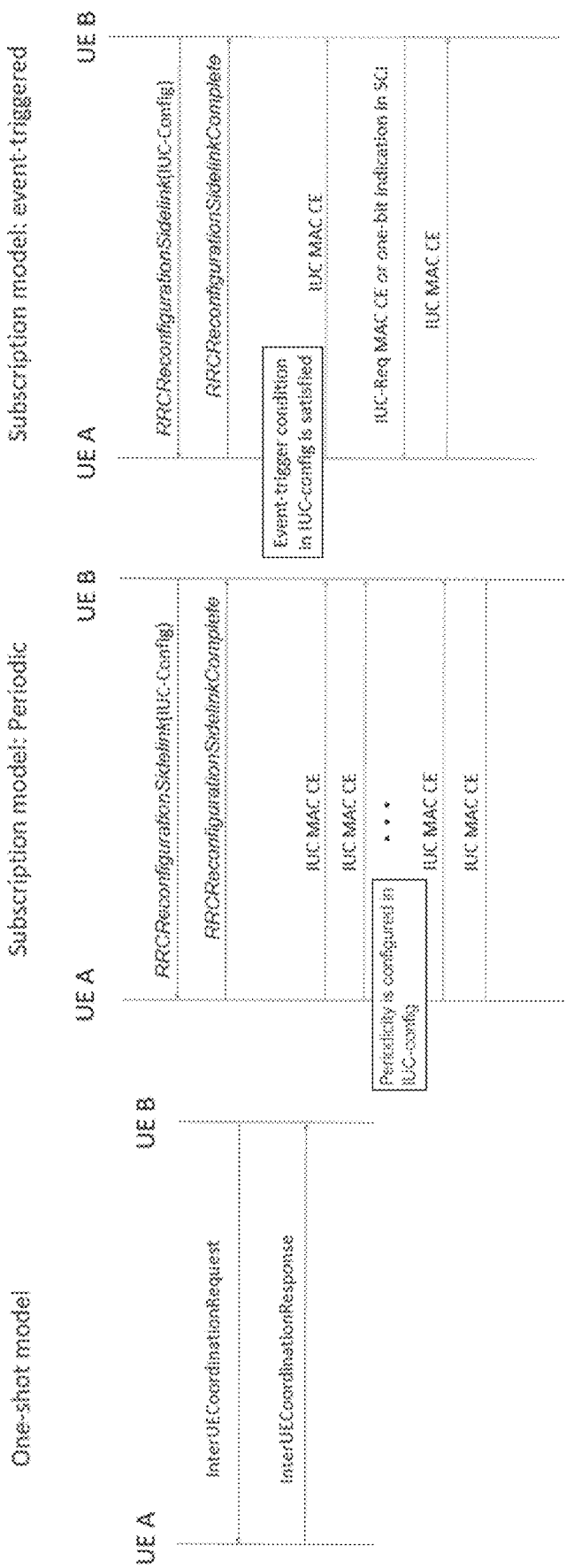
FIG. 5 is a set of annotated message diagrams for three different subscription models.

On the left side of FIG. 5, a one-shot model is shown. According to this model, UE B tells the UE A what to sense/check, and UE A response with results immediately or after a while. For one-shot IUC: MAC-CE is preferred, but PC5-RRC can also be used.

The middle and right sides of FIG. 5 show different subscription models. In both, a UE B subscribes UE A's IUC service with upper-layer signaling. In some embodiments, upper-layer signaling includes PC5-RRC, then the exact exchange after subscription may be done as MAC CE or PC5-RRC. Once subscribed, UE A shares the IUC results periodically (without soliciting) as shown in the middle of FIG. 5 or event-triggered as shown on the right side of FIG. 5. In some embodiments, the triggering events for UE A may include: number/ratio of good or bad resource exceeds a certain amount; channel busy radio (CBR) is high, or UE B explicitly requests it (e.g., in L1 SCI signaling or MAC-CE).

Figure 6:
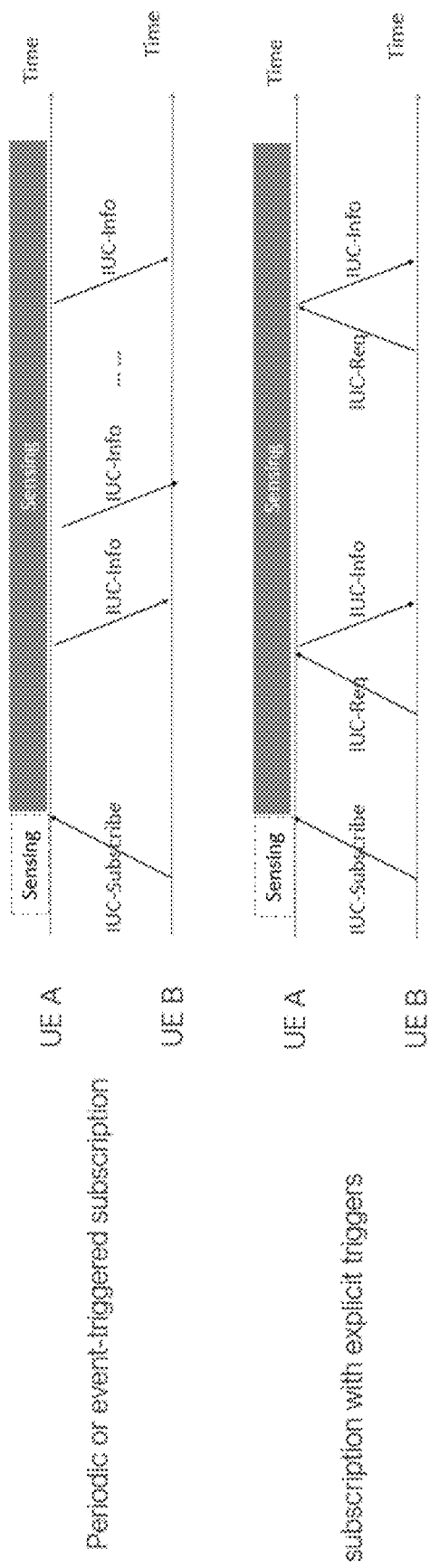
FIG. 6 is a pair of annotated timing diagrams for different subscription mechanisms.

FIG. 6 shows examples of timing relationships for the different subscription mechanisms shown in FIG. 5. A UE A starts sensing when UE A receiving the on target transmit pool information. Note that it is possible that UE A may already have started sensing the target pool for some other reasons (e.g., previously requested by another peer UE).

It is possible that "IUC-subscribe" signaling gives the whole pool for UE to sense, but sending a follow request to reduce the granularity of a report (only a few resources needs to be indicated as preferred or not prefer).

Figure 7:
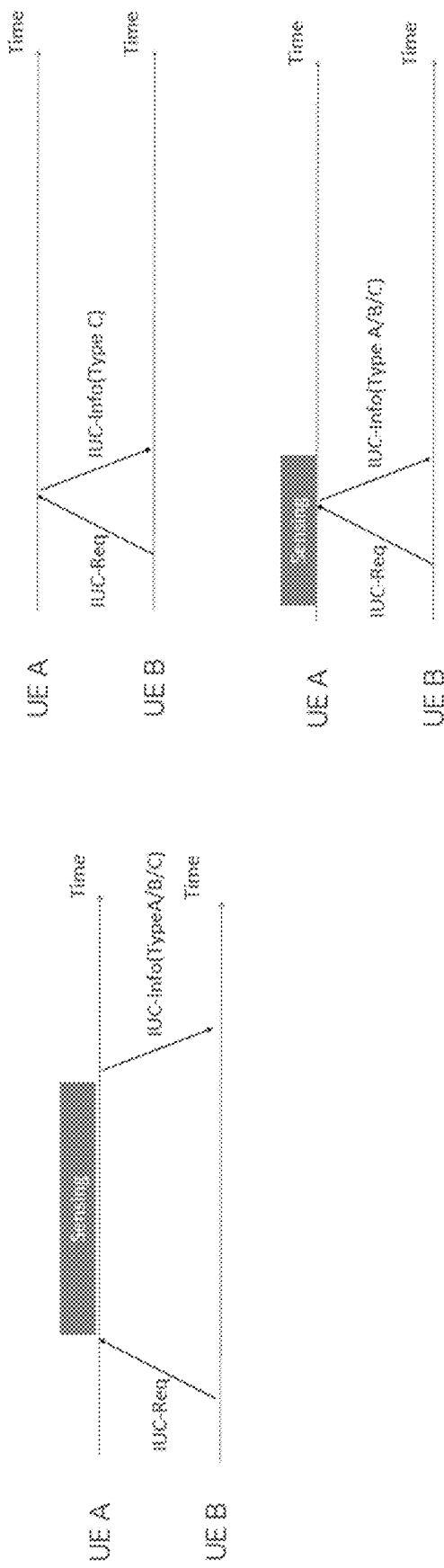
FIG. 7 is a set of annotated timing diagrams for different one-shot trigger configurations.

FIG. 7 shows example timing diagrams for the One-shot model of FIG. 5. In one embodiment, one-shot essentially acts as a case of subscribe mechanism but with a one-time timing trigger. The left side of FIG. 7 shows an example of a UE A receiving a request and responding after sensing. The top of the right side shows a type C immediate response when there is no sensing. Type C reporting may not need sensing (detected resource conflicts). The bottom of the right side in FIG. 7 shows a response is provided during sensing and UE A may stop sensing to respond to a one-shot request.

Figure 8:
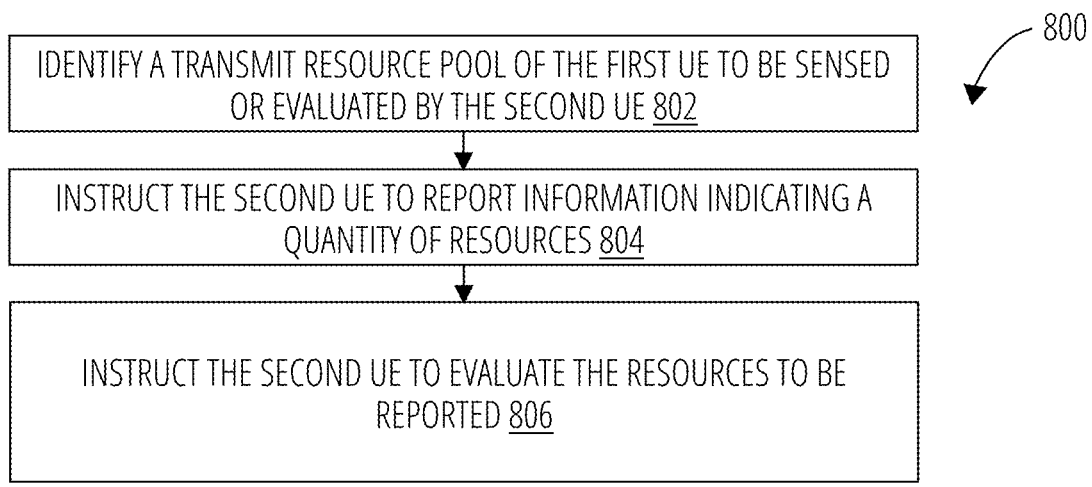
FIG. 8 is a flow diagram of a process of request signaling via a PC5 link with a second UE for configuring inter-UE coordination with on-demand sensing.

FIG. 8 shows a routine 800, performed by a first user equipment (UE) for a 5G network, of request/subscribe signaling via a PC5 link with a second UE for configuring inter-UE coordination with on-demand sensing. In block 802, routine 800 identifies a transmit resource pool of the first UE to be sensed or evaluated by the second UE. In block 804, routine 800 instructs the second UE to report information indicating a quantity of resources. In block 806, routine 800 instructs the second UE to evaluate the resources.

In some embodiments, the request/subscribe signaling covers the following aspects: (1) identify the transmit resource pool (of UE B) to be sensed/evaluated by UE A (including four options described below); (2) instruct how many resources needs to be reported, e.g., min and max size limit, type A/B/C constraints; (3) instruct UE A how to evaluate a resource with additional parameters, e.g., SL priority of UE B traffic, periodicity of resource reservation, and re-selection counter (e.g., an upper bound of how long the periodicity will last, and the resource will be used periodically until reaching the reselection counter); and (4) optional additional constraints/conditions, e.g., respond timing requirement immediately or a timing bound based on packet delay budget.

When instructing UE A how to evaluate a resource with additional parameters, the UE A can use a priority x to evaluate the sensing results. For instance, if UE A is sensing a transmission having relatively lower priority than priority x in a certain resource, the resource's evaluation results will be negatively impacted (compared to an completely empty resource), but the impact is bigger if the SL transmission sensed has a higher-priority than priority x. Also, the resource reservation period means the sensing need to consider the soundness of "periodic" reservation, so any conflicts for future reservations with a periodicy T would be taken into account in some embodiments.

The four options to identify the transmit resource pool include (1) a transmit pool identifier (ID), i.e., an index, which means that the pool ID assignments are uniform among all gNBs and out-of-coverage (OOC) configurations; (2) an implicit indication corresponding to the transmit pool used by the UE B to transmit its request (no need to indicate pool ID); (3) explicit transmit pool configuration, i.e., pro- viding the pool information, which may have a large overhead suitable for RRC signaling; and (4) explicit sequence of resources, such that for each resource the frequency carrier, subchannel (starting resource block and number resource blocks), and time slot index are indicated. When there is an explicit sequence of resources signaled, there may be options to reduce the size and how to order the sequence (e.g., based on time or subchannel).

If request signaling serves as a configuration of the subscription mechanism, it may include a periodic timer or indicate it is event-triggered. Examples of triggering events were described previously (e.g., number/ratio of good or bad resource exceeds a certain amount, CBR is high, or UE explicitly requests it).

Figure 9:
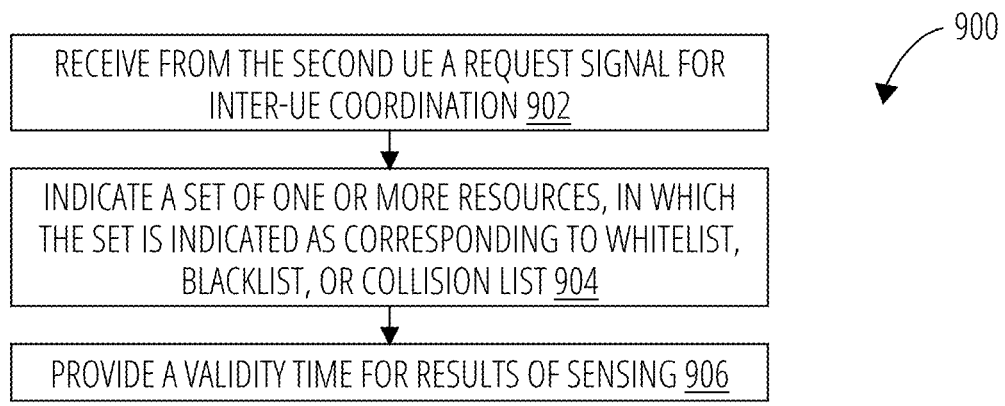
FIG. 9 is a flow diagram of a process of response signaling via a PC5 link with a second UE for configuring inter-UE coordination with on-demand sensing.

FIG. 9 shows a routine 900, performed by a first user equipment (UE) for a 5G network, of response signaling via a PC5 link with a second UE for configuring inter-UE coordination with on-demand sensing. In block 902, routine 900 receives from the second UE a request signal for inter-UE coordination. In block 904, routine 900 indicates a set of one or more resources, in which the set is indicated as corresponding to whitelist, blacklist, or collision list. In block 906, routine 900 provides a validity time for results of sensing.

The design of the response signaling, in some embodiments, includes information indicating a set of one or more resources. The information may include a set type (A (whitelist), B (blacklist), or C (collision list)). Each resource may be represented by an index, corresponding to the pool configuration or sequence of resource requested in the request signaling. It also may be sent as a bitmap, where "0" means a non-usual resource, "1" means a usable resource, or vice versa. Further information may also be included for classifying the justifications for resource recommendation, e.g., indicate whether the blacklist is based on sensing (i.e., potentially bad resource but may still be usable) or data reception decoding (i.e., clearly unusual resource). Also, for resources indicated in type A or B, they are indicated as a one-shot recommendation or periodic recommendation. This means the resource indicated in set A or B is regarded as good for one-time use, or good for periodic resource reservation (e.g., used in every 100 ms).

The response signaling information may also include a validity time. The UE A may not have "fresh" results all the time because, for example, sensing is computationally intensive and takes time. To save power, the UE A may just report some old results as weak or general guidance. This can also be replaced with a timestamp on when the results are obtained. Validity information elements (IEs), therefore, can be used to represent the validity of: (1) the overall assistance information; (2) per each individual type; or (3) per each individual resource.

In some embodiments, there is a priority of IUC signaling. For SL MAC CE, this may be equal or higher priority than the SL-CSI report. For PC5-RRC, this is similar to the logical channel (LCH) priority of other PC5-RRC signaling in the same SL-SRB.

Uu signaling (e.g., signaling from gNB) is included, according to some embodiments, to enable additional functionality. For example, inter-UE coordination can be enabled or disabled per cell or per-UE by Uu signaling, in which case per-cell signaling may be in a V2X SIB, or per-UE signaling may be in dedicated RRC configuration (e.g., RRCReconfiguration) or pre-configuration (out-of-coverage case). In another example, RRC_CONNECTED UE B shares the received IUC content from UE A to its serving gNB in UEAssistanceInformation. And in another example, "inter- UE coordination" is defined as a new UE capability for sidelink, exchanged in either a Uu or PC5 interface.

Figure 10:
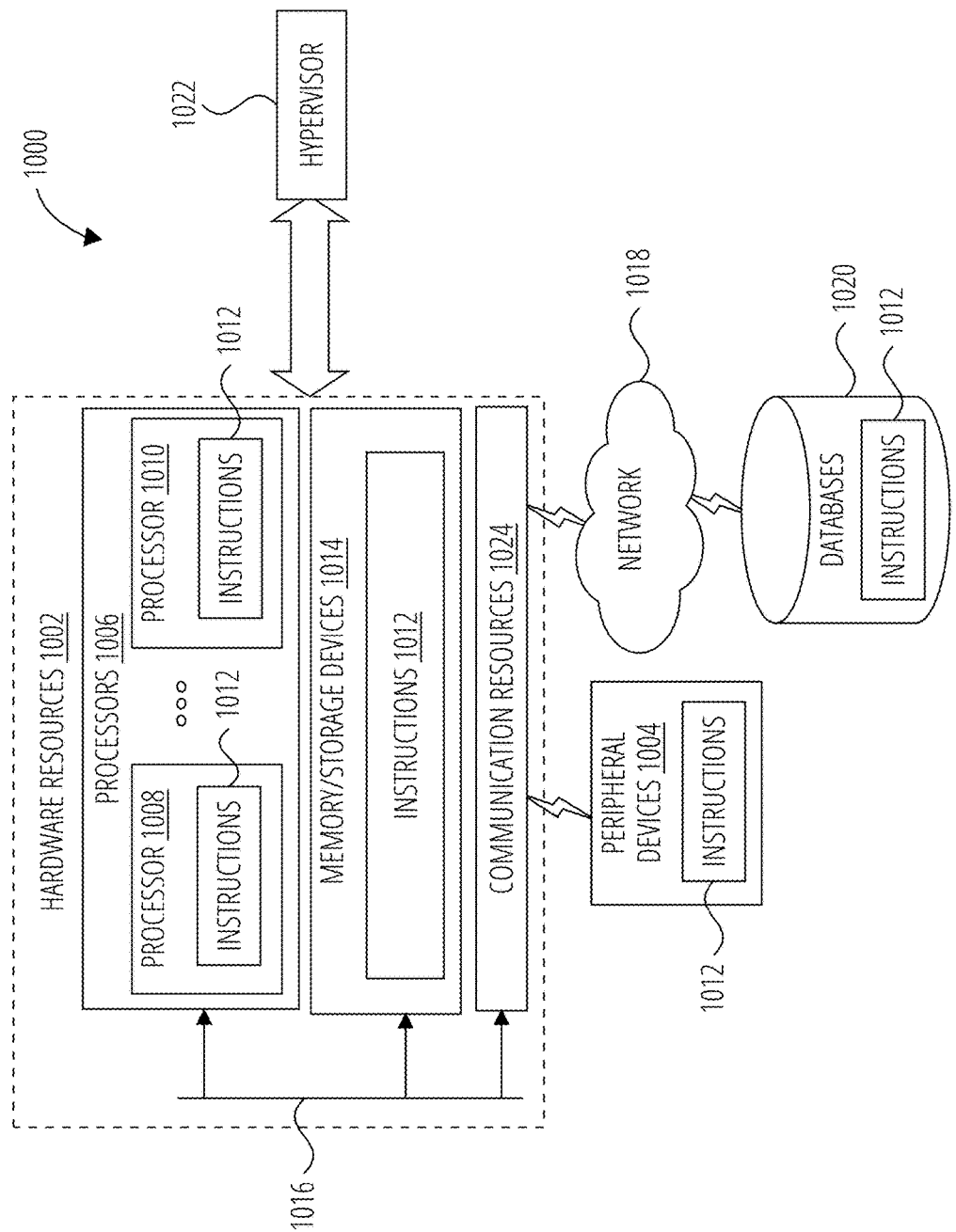
FIG. 10 is a block diagram, according to one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1006 (or processor cores), one or more memory/storage devices 1014, and one or more communication resources 1024, each of which may be communicatively coupled via a bus 1016. For embodiments where node virtualization (e.g., NFV) is utilized, a hypervisor 1022 may be executed to provide an execution environment for one or more network slices/sub-slices to utilize the hardware resources 1002.

The processors 1006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1008 and a processor 1010.

The memory/storage devices 1014 may include main memory, disk storage, or any suitable combination thereof. The memory/storage devices 1014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1024 may include interconnection or network interface components or other suitable devices to communicate with one or more peripheral devices 1004 or one or more databases 1020 via a network 1018. For example, the communication resources 1024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1012 may comprise software, a program, an application, an applet, an app, or other executable code for causing at least any of the processors 1006 to perform any one or more of the methodologies discussed herein. The instructions 1012 may reside, completely or partially, within at least one of the processors 1006 (e.g., within the processor's cache memory), the memory/storage devices 1014, or any suitable combination thereof. Furthermore, any portion of the instructions 1012 may be transferred to the hardware resources 1002 from any combination of the peripheral devices 1004 or the databases 1020. Accordingly, the memory of the processors 1006, the memory/storage devices 1014, the peripheral devices 1004, and the databases 1020 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method, performed by a first user equipment (UE) for a 5G network, of request signaling via a PC5 link with a second UE for configuring inter-UE coordination, the method comprising: identifying a transmit resource pool of the first UE to be sensed or evaluated by the second UE; instructing the second UE to report information indicating a quantity of resources; and instructing the second UE to evaluate the resources to be reported.

Example 2 is the method of Example 1, in which the instructing the second UE to evaluate the resources to be reported is based on sidelink priority of traffic of the first user equipment, periodicity of resource reservation, and a re-selection counter.

Example 3 is the method of Example 1, in which the instructing the second UE to evaluate the resources to be reported is further based on a timing requirement for the report information.

Example 4 is the method of Example 1, in which the identifying the transmit resource pool includes providing a transmit pool identifier.

Example 5 is the method of Example 4, in which transmit pool identifier corresponds to a pool configured in radio resource control (RRC) signaling.

Example 6 is the method of Example 1, in which the identifying the transmit resource pool includes an implicit identification corresponding to a transmit resource pool used by the first UE to transmit its request.

Example 7 is the method of Example 1, in which the identifying the transmit resource pool includes providing an explicit transmit pool configuration.

Example 8 is the method of Example 1, in which the identifying the transmit resource pool includes providing an explicit sequence of resources.

Example 9 is a method, performed by a first user equipment (UE) for a 5G network, of response signaling via a PC5 link with a second UE for configuring inter-UE coordination, the method comprising: receiving from the second UE a request signal for inter-UE coordination; indicating a set of one or more resources, in which the set is indicated as corresponding to whitelist, blacklist, or collision list; and providing a validity time for resources indicated.

Example 10 is the method of Example 9, in which each resource of the set is represented by an index corresponding to a pool configuration.

Example 11 is the method of Example 9, in which each resource of the set is represented by an index corresponding to a sequence of resources requested in the request signal.

Example 12 is the method of Example 9, in which a resource of the set is a whitelist type of resource and the indicating further comprises indicating the recourse is a one-shot resource.

Example 13 is the method of Example 9, in which a resource of the set is a blacklist type of resource and the indicating further comprises indicating the recourse is a one-shot resource.

Example 14 is the method of Example 9, in which a resource of the set is a whitelist type of resource and the indicating further comprises indicating the recourse is a periodic resource.

Example 15 is the method of Example 9, in which a resource of the set is a blacklist type of resource and the indicating further comprises indicating the recourse is a periodic resource.

Example 16 is the method of Example 9, in which each resource of the set is represented by bitmap.

Example 17 is the method of Example 9, in which a resource of the set is a blacklist type of resource and further comprising indicating whether the resource is blacklisted based on sensing.

Example 18 is the method of Example 9, in which a resource of the set is a blacklist type of resource and further comprising indicating whether the resource is blacklisted based on decoding.

Example 19 is a non-transitory computer-readable storage medium, the computer-readable storage medium including instructions that when executed by a first user equipment (UE) configured to perform request signaling via a PC5 link with a second UE for inter-UE coordination, cause the first UE to: identify a transmit resource pool of the first UE to be sensed or evaluated by the second UE; instruct the second UE to report information indicating a quantity of resources; and instruct the second UE to evaluate the resources to be reported.

Example 20 is the computer-readable storage medium of Example 19, in which the instructions further cause the first UE to instruct the second UE to evaluate the resources to be reported based on sidelink priority of traffic of the first user equipment, periodicity of resource reservation, and a re-selection counter.

Example 21 is the computer-readable storage medium of Example 19, in which the instructions further cause the first UE to instruct the second UE to evaluate the resources to be reported based on a timing requirement for the report information.

Example 22 is the computer-readable storage medium of Example 19, in which the instructions further cause the first UE to identify the transmit resource pool according to a transmit pool identifier.

Example 23 is the computer-readable storage medium of Example 22, in which transmit pool identifier corresponds to a pool configured in radio resource control (RRC) signaling.

Example 24 is the computer-readable storage medium of Example 19, in which the instructions further cause the first UE to identify the transmit resource pool based on an implicit identification corresponding to a transmit resource pool used by the first UE to transmit its request.

Example 25 is the computer-readable storage medium of Example 19, in which the instructions further cause the first UE to identify the transmit resource pool based on an explicit transmit pool configuration.

Example 26 is the computer-readable storage medium of Example 19, in which the instructions further cause the first UE to identify the transmit resource pool based on an explicit sequence of resources.

Example 27 is a non-transitory computer-readable storage medium, the computer-readable storage medium including instructions that when executed by a first user equipment (UE) configured to perform response signaling via a PC5 link with a second UE for inter-UE coordination, cause the first UE to: receive from the second UE a request signal for inter-UE coordination; indicate a set of one or more resources, in which the set is indicated as corresponding to whitelist, blacklist, or collision list; and provide a validity time for resources indicated.

Example 28 is the computer-readable storage medium of Example 27, in which each resource of the set is represented by an index corresponding to a pool configuration.

Example 29 is the computer-readable storage medium of Example 27, in which each resource of the set is represented by an index corresponding to a sequence of resources requested in the request signal.

Example 30 is the computer-readable storage medium of Example 27, in which a resource of the set is a whitelist type of resource and the indicate further comprises indicating the recourse is a one-shot resource.

Example 31 is the computer-readable storage medium of Example 27, in which a resource of the set is a blacklist type of resource and the indicate further comprises indicating the recourse is a one-shot resource.

Example 32 is the computer-readable storage medium of Example 27, in which a resource of the set is a whitelist type of resource and the indicate further comprises indicating the recourse is a periodic resource.

Example 33 is the computer-readable storage medium of Example 27, in which a resource of the set is a blacklist type of resource and the indicate further comprises indicating the recourse is a periodic resource.

Example 34 is the computer-readable storage medium of Example 27, in which each resource of the set is represented by bitmap.

Example 35 is the computer-readable storage medium of Example 27, in which a resource of the set is a blacklist type of resource and wherein the instructions further configure the computer to indicate whether the resource is blacklisted based on sensing.

Example 36 is the computer-readable storage medium of Example 27, in which a resource of the set is a blacklist type of resource and wherein the instructions further configure the computer to indicate whether the resource is blacklisted based on decoding.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method, performed by a first user equipment (UE) for a 5G network, of request signaling via a PC5 link with a second UE for configuring inter-UE coordination, the method comprising:
    identifying a transmit resource pool of the first UE to be sensed or evaluated by the second UE;
    indicating a set of resources from the transmit resource pool as corresponding to whitelist, blacklist, or collision list;
    providing a validity time for indicated resources in the set of resources corresponding to the whitelist, blacklist, or collision list;
    instructing the second UE to report information indicating a quantity of resources based on the whitelist, blacklist, or collision list; and
    instructing the second UE to evaluate the resources to be reported.

2. The method of claim 1, in which the instructing the second UE to evaluate the resources to be reported is based on sidelink priority of traffic of the first user equipment, periodicity of resource reservation, and a re-selection counter.

3. The method of claim 1, in which the instructing the second UE to evaluate the resources to be reported is further based on a timing requirement for the report information.

4. The method of claim 1, in which the identifying the transmit resource pool includes providing a transmit pool identifier.

5. The method of claim 4, in which transmit pool identifier corresponds to a pool configured in radio resource control (RRC) signaling.

6. The method of claim 1, in which the identifying the transmit resource pool includes an implicit identification corresponding to a transmit resource pool used by the first UE to transmit its request.

7. The method of claim 1, in which the identifying the transmit resource pool includes providing an explicit transmit pool configuration.

8. The method of claim 1, in which the identifying the transmit resource pool includes providing an explicit sequence of resources.

9. A method, performed by a first user equipment (UE) for a 5G network, of response signaling via a PC5 link with a second UE for configuring inter-UE coordination, the method comprising:
    receiving from the second UE a request signal for inter-UE coordination;
    indicating a set of one or more resources, in which the set is indicated as corresponding to whitelist, blacklist, or collision list; and
    providing a validity time for resources indicated in the set of resources corresponding to the whitelist, blacklist, or collision list.

10. The method of claim 9, in which each resource of the set is represented by an index corresponding to a pool configuration.

11. The method of claim 9, in which each resource of the set is represented by an index corresponding to a sequence of resources requested in the request signal.

12. The method of claim 9, in which a resource of the set is a whitelist type of resource and the indicating further comprises indicating the resource is a one-shot resource.

13. The method of claim 9, in which a resource of the set is a blacklist type of resource and the indicating further comprises indicating the resource is a one-shot resource.

14. The method of claim 9, in which a resource of the set is a whitelist type of resource and the indicating further comprises indicating the resource is a periodic resource.

15. The method of claim 9, in which a resource of the set is a blacklist type of resource and the indicating further comprises indicating the resource is a periodic resource.

16. The method of claim 9, in which each resource of the set is represented by bitmap.

17. The method of claim 9, in which a resource of the set is a blacklist type of resource and further comprising indicating whether the resource is blacklisted based on sensing.

18. The method of claim 9, in which a resource of the set is a blacklist type of resource and further comprising indicating whether the resource is blacklisted based on decoding.

19. A non-transitory computer-readable storage medium, the computer-readable storage medium including instructions that when executed by a first user equipment (UE) configured to perform request signaling via a PC5 link with a second UE for inter-UE coordination, cause the first UE to:

identify a transmit resource pool of the first UE to be sensed or evaluated by the second UE;

indicate a set of resources from the transmit resource pool as corresponding to whitelist, blacklist, or collision list;

provide a validity time for indicated resources in the set of resources corresponding to the whitelist, blacklist, or collision list;

instruct the second UE to report information indicating a quantity of resources based on the whitelist, blacklist, or collision list; and instruct the second UE to evaluate the resources to be reported.

20. The computer-readable storage medium of claim 19, in which the instructions further cause the first UE to instruct the second UE to evaluate the resources to be reported based on sidelink priority of traffic of the first user equipment, periodicity of resource reservation, and a re-selection counter.

* * * * *